US012652555B2

(12) United States Patent
Hong

(10) Patent No.: US 12,652,555 B2
(45) Date of Patent: Jun. 9, 2026

(54) MEASUREMENT GAP PRE-CONFIGURATION PROCESSING METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 284 days.

(21) Appl. No.: 18/552,611

(22) PCT Filed: Apr. 1, 2021

(86) PCT No.: PCT/CN2021/085026
§ 371 (c)(1),
(2) Date: Sep. 26, 2023

(87) PCT Pub. No.: WO2022/205341
PCT Pub. Date: Oct. 6, 2022

(65) Prior Publication Data
US 2024/0163696 A1 May 16, 2024

(51) Int. Cl.
*H04W 24/02* (2009.01)
*H04W 24/10* (2009.01)
*H04W 72/0457* (2023.01)
*H04W 76/20* (2018.01)

(52) U.S. Cl.
CPC ........... *H04W 24/02* (2013.01); *H04W 24/10* (2013.01); *H04W 72/0457* (2023.01); *H04W 76/20* (2018.02)

(58) Field of Classification Search
CPC . H04W 24/02; H04W 24/10; H04W 72/0457; H04W 76/20; H04W 36/06; H04W 36/0088; H04W 24/08
USPC ........................................................ 370/329
See application file for complete search history.

(56) References Cited

U.S. PATENT DOCUMENTS

| | | | |
|---|---|---|---|
| 2020/0296612 A1 | 9/2020 | Ma et al. | |
| 2020/0314946 A1 | 10/2020 | Tsuboi et al. | |
| 2021/0076230 A1* | 3/2021 | Chen | ........................ H04L 5/001 |
| 2022/0052828 A1* | 2/2022 | Yiu | ........................ H04L 5/0098 |

(Continued)

FOREIGN PATENT DOCUMENTS

| | | |
|---|---|---|
| WO | WO 2019092943 A1 | 5/2019 |
| WO | WO 2020060952 A1 | 3/2020 |

OTHER PUBLICATIONS

International Search Report and Written Opinion of International Application No. PCT/CN2021/085026, mailed Jan. 4, 2022, 15 pages.

(Continued)

*Primary Examiner* — Chi Tang P Cheng
*Assistant Examiner* — Michael Wayne Maddox
(74) *Attorney, Agent, or Firm* — Finnegan, Henderson, Farabow, Garrett & Dunner, L.L.P.

(57) ABSTRACT

A method for processing measurement gap pre-configuration is performed by a user equipment (UE), and includes: receiving measurement gap indication information, wherein the measurement gap indication information is configured to indicate whether the UE needs a measurement gap on a configured bandwidth part (BWP).

12 Claims, 6 Drawing Sheets

```
┌──────────────┐                        ┌──────────────┐
│      UE      │                        │ base station │
└──────┬───────┘                        └──────┬───────┘
       │                                       │
       │                                       │

S31: receiving measurement gap indication
   information, in which the measurement gap
   indication information is configured to
   indicate whether the UE needs a measurement
   gap on a configured BWP │◄····································· │
       │                                       │
       │                                       │
```

(56)            References Cited

U.S. PATENT DOCUMENTS

| | | | |
|---|---|---|---|
| 2023/0047684 A1* | 2/2023 | Hu | H04W 24/02 |
| 2023/0328571 A1* | 10/2023 | Wang | H04W 76/28 |
| | | | 370/241 |
| 2024/0147288 A1* | 5/2024 | Huang | H04B 17/24 |
| 2024/0235756 A1* | 7/2024 | Futaki | H04W 36/165 |

OTHER PUBLICATIONS

Notice of the first review opinion for Japanese Patent Application No. 2023-560615, dated Sep. 27, 2024, 12 pages.

Extended European Search Report issued in Application No. 21933999.1, dated Dec. 9, 2024, 13 pages.

The First Office Action for Chinese Patent Application No. 202180001083.4, dated Dec. 19, 2024, 21 pages.

Catt, "Initial discussion on pre-configured MG pattern", 3GPP TSG-RAN4 Meeting #98-e, R4-2100454, Electronic meeting, Jan. 25-Feb. 5, 2021, 5 pages.

Office Action for Singapore Patent Application No. 11202307440V dated Jan. 4, 2026, 10 pages.

* cited by examiner

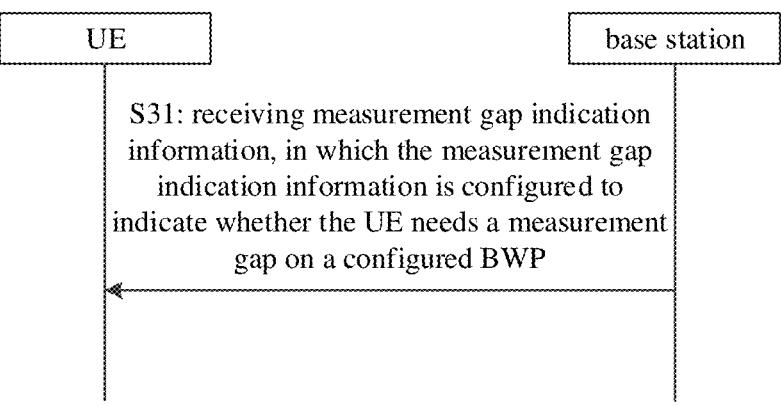
FIG. 3
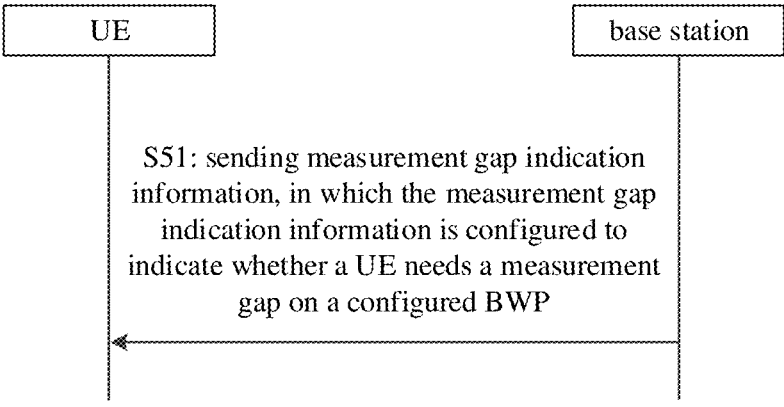
FIG. 4
FIG. 5

| UE | | base station |
|---|---|---|

S71: sending IE BWP-downlink signaling, in which the IE BWP-downlink signaling is configured to indicate a configured BWP for the UE

MEASUREMENT GAP PRE-CONFIGURATION PROCESSING METHOD AND APPARATUS, COMMUNICATION DEVICE AND STORAGE MEDIUM

CROSS-REFERENCE TO RELATED APPLICATION

This application is a U.S. national phase application of International Application No. PCT/CN2021/085026, filed on Apr. 1, 2021, the content of which is hereby incorporated by reference in its entirety.

TECHNICAL FIELD

The present disclosure relates to, but is not limited to, a field of wireless communication technology, and in particular to, a method and apparatus for processing measurement gap pre-configuration, a communication device, and a storage medium.

BACKGROUND

In a new radio (NR) system, when a user equipment (UE) performs measurement, for example, radio resource management (RRM) measurement, or synchronization signal block (SSB) measurement, channel state information-RS (CSI-RS) measurement, and the like, if it is not in a current measurement frequency domain, the UE needs to perform the measurement based on a measurement gap. However, in a current protocol, the network always assumes that the measurement gap is needed during the measurement, so that a measurement efficiency of the UE is relatively low or a throughput performance of the UE is poor.

SUMMARY

The present disclosure discloses a method and apparatus for processing measurement gap pre-configuration, a communication device and a storage medium.

According to a first aspect of the embodiments of the present disclosure, a method for processing measurement gap pre-configuration is provided. The method is performed by a user equipment (UE), and includes:

receiving measurement gap indication information, in which the measurement gap indication information is configured to indicate whether UE needs a measurement gap on a configured bandwidth part (BWP).

According to a second aspect of the embodiments of the present disclosure, a method for processing measurement gap pre-configuration is provided. The method is performed by a base station, and includes:

sending measurement gap indication information, in which the measurement gap indication information is configured to indicate whether a UE needs a measurement gap on a configured BWP.

According to a third aspect of the embodiments of the present disclosure, a communication device is provided, and includes:

a processor;

a memory configured to store instructions executable by the processor;

in which the processor is configured to perform the method for processing measurement gap pre-configuration in any of the embodiments in the present disclosure when the instructions are executed.

According to a fourth aspect of the embodiments of the present disclosure, a computer storage medium with a computer-executable program stored thereon is provided. The method for processing measurement gap pre-configuration in any of embodiments in the present disclosure is implemented, when the computer-executable program is executed by a processor.

It should be understood that the above general descriptions and following detailed descriptions are only illustrative and descriptive, may not be a limitation in an embodiment of the disclosure.

BRIEF DESCRIPTION OF THE DRAWINGS

FIG. 3 is a flowchart illustrating a method for processing measurement gap pre-configuration according to an example embodiment.

FIG. 4 is a flowchart illustrating a method for processing measurement gap pre-configuration according to an example embodiment.

FIG. 5 is a flowchart illustrating a method for processing measurement gap pre-configuration according to an example embodiment.

DETAILED DESCRIPTION

The example embodiments will be described in detail here, and examples thereof are shown in the accompanying drawings. When the following descriptions are referred to the accompanying drawings, unless otherwise indicated, the same numbers in different drawings represent the same or similar elements. The implementations described in the following example embodiments do not represent all implementations consistent with the present disclosure. Rather, they are merely examples of apparatuses and methods consistent with some aspects of the present disclosure as detailed in the appended claims.

The terms described in the present disclosure are only for the purpose of describing specific embodiments and are not intended to limit the embodiments of the present disclosure. The singular forms "a", "the" and "said" used in the embodiments of the present disclosure and the attached claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in the embodiments of the present disclosure to describe various information, such information shall not be limited to these terms. These terms are only used to distinguish the same type of information. For example, subject to the scope of this present disclosure, first information may also be referred to as second information, and similarly, and second information may also be referred to as first information. It depends on the context. For example, the word "if" as used herein may be interpreted as "in a case that" or "when" or "in response to determination".

Figure 1:
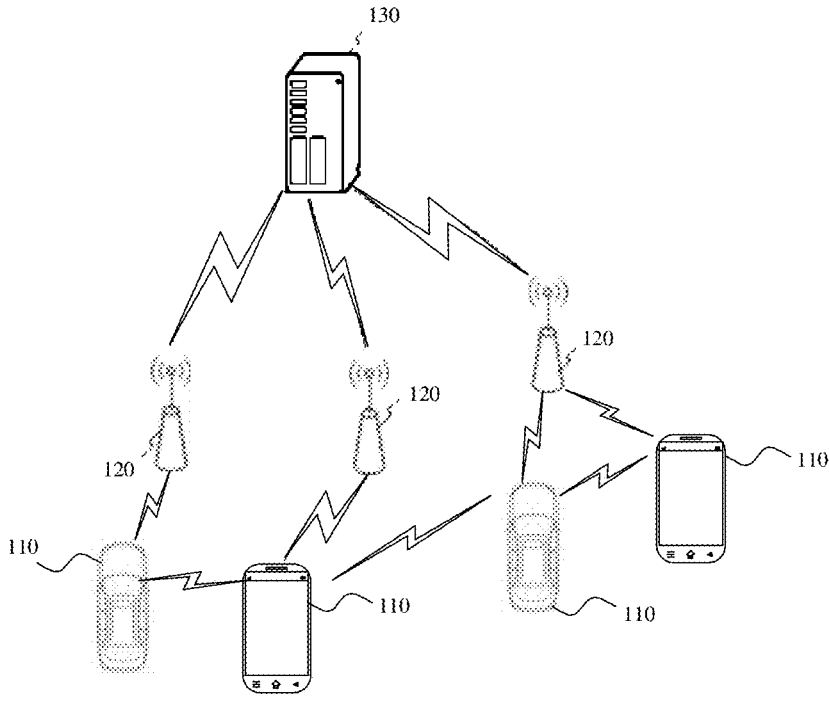
FIG. 1 is a diagram illustrating a wireless communication system according to an example embodiment.

FIG. 1 is a diagram illustrating a wireless communication system provided in an embodiment of the present disclosure. As illustrated in FIG. 1, the wireless communication system is a communications system based on a cellular mobile communication technology. The wireless communication system may include several user devices 110 and several base stations 120.

The user device 110 may refer to a device that provides voice and/or data connectivity to a user. The user device 110 may communicate with one or more core networks via a radio access network (RAN). The user device 110 may be an internet of things user device, for example, a sensor device, a mobile phone (or referred to as a "cellular" phone) and a computer having an internet of things user device, for example, may be a fixed, portable, compact, handheld, computer built-in or vehicle-mounted apparatus, for example, a station (STA), a subscriber unit, a subscriber station, a mobile station, a mobile, a remote station, an access point, a remote terminal, an access terminal, a user terminal, a user agent, a user device or a user equipment (UE). Or, the user device 110 may be a device of an unmanned aerial vehicle. Or, the user device 110 may be a vehicle-mounted device. For example, may be an electronic control unit with a wireless communication function, or a wireless user device externally connected to the electronic control unit. Or, the user device 110 may be a roadside device, for example, may be a street lamp with the wireless communication function, a signal light or other roadside devices, and the like.

The base station 120 may be a network side device in the wireless communication system. The wireless communication system may be a 4th generation mobile communication (4G) system, also referred to as a long term evolution (LTE) system; or the wireless communication system may be a 5G system, also referred to as a new radio (NR) system or a 5G NR system. Or, the wireless communication system may be a next generation system of the 5G system. An access network in a 5G system may be referred to as a new generation-radio access network (NG-RAN).

The base station 120 may be an eNB adopted in the 4G system. Or, the base station 120 may be a base station (gNB) with a centralized distributed architecture in the 5G system. When the base station 120 adopts the centralized distributed architecture, the base station 120 generally includes a central unit (CU) and at least two distributed units (DU). Protocol stacks of a packet data convergence protocol (PDCP) layer, a radio link control (RLC) layer and a media access control (MAC) layer are configured in the CU; a physical (PHY) layer protocol stack is configured in the DU. The specific implementation of the base station 120 is not limited in the embodiments of the disclosure.

The base station 120 may establish a wireless connection with the user device 110 via a wireless air interface. In different implementations, the wireless air interface is a wireless air interface based on a 4G standard; or, the wireless air interface is a wireless air interface based on a 5G standard. For example, the wireless air interface is a new radio interface; or, the wireless air interface may be a wireless air interface based on a standard of next generation mobile communication network technology of the 5G.

In some embodiments, an end to end (E2E) connection can also be established between the user devices 110, for example, in vehicle to vehicle (V2V) communication, vehicle to infrastructure (V2I) communication, vehicle to pedestrian (V2P) communication and the like in vehicle to everything (V2X) communication.

Here, the above-mentioned user device may be considered to be a terminal device in the following embodiments.

In some embodiment, the above wireless communication system may further include a network management device 130.

The several base stations 120 are connected with the network management device 130 respectively. The network management device 130 may be a core network device in the wireless communication system, for example, the network management device 130 may be a mobility management entity (MME) in an evolved packet core (EPC) network. Or, the network management device may be other core network devices, for example, a serving gateway (SGW), a public data network gateway (PGW), a policy and charging rules function (PCRF) or a home subscriber server (HSS), and the like. The implementation of the network management device 130 is not limited in the embodiments of the present disclosure.

In order to better understand a technical solution described in any embodiment of the present disclosure, firstly, measurement gap scheduling when the UE performs measurement is described in the following.

In an embodiment, the measurement gap may be configured through a radio resource control (RRC) configuration or an RRC reconfiguration. A bandwidth part (BWP) switching mode may be configured through one of an RRC configuration, the RRC reconfiguration, a downlink control information (DCI) configuration, or a timer. In this way, when an activated BWP of the UE is switched, if the BWP is switched through the DCI or timer, the network always assumes that the measurement gap is configured for the measurement, so that when the UE performs the switching, a reference signal can be measured based on the measurement gap. However, if the network always assumes that the measurement gap is configured for the measurement, a loss of throughput can be caused to the network and the terminal.

Figure 2:
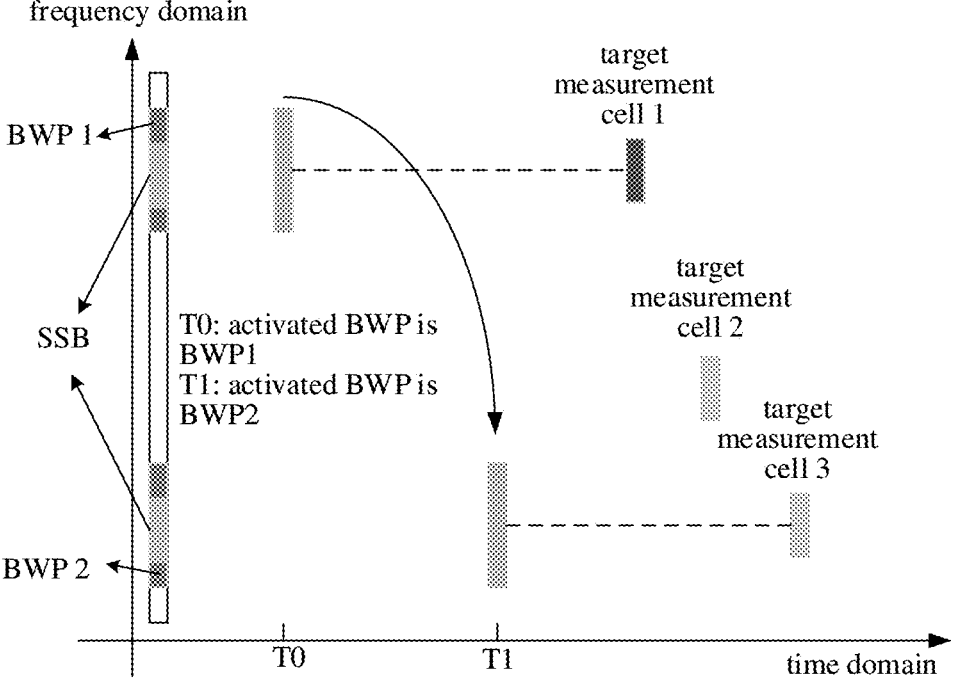
FIG. 2 is a diagram illustrating measurement gap scheduling according to an example embodiment.

As shown in FIG. 2, in an embodiment, an activated BWP of the UE at T0 moment is BWP1, the UE does not need the measurement gap when the UE is in a target measurement cell 1, and needs the measurement gap when the UE is in either a target measurement cell 2 or a target measurement cell 3. When the activated BWP of the UE is switched to BWP2, the UE does not need the measurement gap when the UE is in the target measurement cell 3, and needs the measurement gap when the UE is in either the target measurement cell 1 or the target measurement cell 2. Therefore, in practice, when the activated BWP of the UE is switched, it is switched to different BWPs, and a determination of whether a measurement object corresponding to the BWP needs the measurement gap may not be the same. If the network always configures the measurement gap on each BWP, measurement efficiency and throughput performance of the UE are greatly reduced.

Those skilled in the art may understand that a technical solution of each embodiment of the embodiments in the present disclosure may be implemented separately, or may be implemented together with a technical solution according to any embodiment of the embodiments in the present disclosure, which is not limited in the embodiments of the present disclosure.

As illustrated in FIG. 3, a method for processing measurement gap pre-configuration is provided in an embodiment of the present disclosure, the method is performed by a UE, and includes step S31.

At step S31, measurement gap indication information is received. The measurement gap indication information is configured to indicate whether the UE needs a measurement gap on a configured BWP.

In an embodiment, the UE may be various mobile terminals or fixed terminals. For example, the UE may be, but is not limited to, a mobile phone, a computer, a server, a wearable device, a game control platform, a multimedia device, and the like.

A method for processing measurement gap pre-configuration is provided in an embodiment of the present disclosure, the method is performed by the UE, and includes: receiving the measurement gap indication information sent by a base station. The measurement gap indication information is configured to indicate whether the UE needs the measurement gap on the configured BWP.

In an embodiment, the base station may be various types of base stations, for example, a 3G base station, a 4G base station, a 5G base station, or other evolved base stations.

In an embodiment, the configured BWP for the UE may be a BWP that can be switched to when the UE performs the BWP switching. For example, as shown in FIG. 2, the configured BWP may be BWP 2.

In an embodiment, the number of the configured BWPs for the UE may be one or more. For example, there may be 4 configured BWPs, which are: BWP 1, the BWP 2, BWP 3, and BWP 4, respectively. The configured BWP herein may include an activated BWP of the UE before the UE performs the BWP switching; or may not include the activated BWP of the UE before the UE performs the BWP switching.

In an embodiment, the measurement gap indication information is at least configured to indicate whether a measurement gap is configured on the configured BWP for the UE. Therefore, in the embodiments of the present disclosure, the UE may know whether the measurement gap is configured on the configured BWP in advance through the measurement gap indication information received by the UE.

In an embodiment, the measurement gap indication information is at least configured to indicate whether to activate the measurement gap on the configured BWP for the UE. Therefore, in the embodiments of the present disclosure, the measurement gap being activated on which BWPs and/or not activated on which BWPs in the configured BWP for the UE may be known though the measurement gap indication information received by the UE. The measurement gap of the BWP can be activated before the BWP switching, so that measurement efficiency can be further improved.

In an embodiment, the measurement gap indication information is configured to indicate whether a measurement gap is configured on the configured BWP for the UE and whether to activate the measurement gap on the configured BWP for the UE. Therefore, in the embodiments of the present disclosure, a configuration of the measurement gap on the configured BWP for the UE and an activation of the measurement gap can be simultaneously implemented, which improves the measurement efficiency of the UE.

In an embodiment, the measurement gap indication information is configured to indicate whether the UE needs the measurement gap on all the configured BWPs. For example, the configured BWPs for the UE include: BWP 1, BWP 2, BWP 3, and BWP 4. The measurement gap indication information is configured to indicate whether the measurement gap is needed on the BWP 1, the BWP 2, the BWP 3, and the BWP 4. Therefore, in the embodiments of the present disclosure, whether the measurement gap is needed on all the configured BWPs for the UE may be determined based on the measurement gap indication information configured by the base station.

In other embodiments, the measurement gap indication information is configured to indicate whether the UE needs the measurement gap on at least part of the configured BWPs. For example, the configured BWPs for the UE include: BWP 1, BWP 2, BWP 3, and BWP 4. The measurement gap indication information is configured to at least indicate whether the measurement gap is needed on the BWP 1, or the measurement gap indication information is at least configured to indicate whether the measurement gap is needed on the BWP 1, the BWP 2, and the BWP 3. Therefore, in the embodiments of the present disclosure, whether the measurement gap is needed on at least part of the configured BWPs for the UE may be determined based on the measurement gap indication information configured by the base station.

In other embodiments, the measurement gap indication information may be configured to pre-indicate whether the UE needs the measurement gap on the configured BWP.

In the embodiments of the present disclosure, the measurement gap indication information may be received by the UE, and the measurement gap indication information is configured to indicate whether the UE needs the measurement gap on the configured BWP. In this way, the UE may know whether the measurement gap is needed on the configured BWP for the UE in advance, and the UE needs not to search and determine whether the measurement gap is needed on the configured BWP at the last moment, which improves the measurement efficiency of the UE.

Moreover, with the embodiments of the present disclosure, the UE may know whether the UE needs the measurement gap on the configured BWP, so that when the UE is switched to the configured BWP, the UE may use or not use the measurement gap on the BWP based on activation measurement gap indication information or deactivation measurement gap indication information, thus improving the measurement efficiency and the throughput of the UE during the measurement.

A method for processing measurement gap pre-configuration is provided in an embodiment of the present disclosure, the method is performed by the UE, and includes: receiving the measurement gap indication information. The measurement gap indication information is configured to indicate whether the UE needs the measurement gap for all measurement objects on the configured BWP.

In an embodiment, there is one or more measurement objects on one BWP. The measurement object herein may be a measurement carrier.

Accordingly, in the embodiment of the present disclosure, whether the UE needs the measurement gap for all the measurement objects on each BWP can be determined by receiving the measurement gap indication information sent by the base station.

A method for processing measurement gap pre-configuration is provided in an embodiment of the present disclosure, the method is performed by the UE, and includes:

receiving the measurement gap indication information. The measurement gap indication information is configured to indicate whether the UE needs the measurement gaps for a part of measurement objects on the configured BWP.

Accordingly, in the embodiment of the present disclosure, whether the UE needs the measurement gap for a part of the measurement objects on each BWP may be determined by receiving the measurement gap indication information sent by the base station.

In some embodiments, the measurement gap indication information includes at least one of the following:

activation measurement gap indication information, configured to indicate at least one measurement object for which the UE needs the measurement gap on the configured BWP; or deactivation measurement gap indication information, configured to indicate at least one measurement object for which the UE does not need the measurement gap on the configured BWP.

In another some embodiments, the measurement gap indication information includes at least one of the following:

activation measurement gap indication information, configured to activate a measurement gap of a measurement object on the configured BWP for the UE.

deactivation measurement gap indication information, configured to deactivate a measurement gap of the measurement object on the configured BWP for the UE.

A method for processing measurement gap pre-configuration is provided in an embodiment of the present disclosure, the method is performed by the UE, and may include: receiving the activation measurement gap indication information. The activation measurement gap indication information is configured to indicate at least one measurement object for which the UE needs the measurement gap on the configured BWP.

A method for processing measurement gap pre-configuration is provided in an embodiment of the present disclosure, the method is performed by the UE, and may include: receiving the activation measurement gap indication information is received. The activation measurement gap indication information is configured to activate the measurement gap of the measurement object on the configured BWP for the UE.

In the embodiment of the present disclosure, for activating the measurement gap on the configured BWP for the UE, it is required to configure the measurement gap for the measurement object on the configured BWP for the UE. In this way, in the embodiment of the present disclosure, the measurement gap may be first configured for the measurement object on the configured BWP for the UE, and the measurement gap of the measurement object is activated, so that the measurement gap of the measurement object can be activated in advance, thereby improving the measurement efficiency of the UE.

Receiving the activation measurement gap indication information herein may be: receiving the activation measurement gap indication information sent by the base station.

The activation measurement gap indication information herein may be configured to indicate the at least one measurement object for which the UE needs the measurement gap in all or a part of measurement objects on the configured BWP.

A method for processing measurement gap pre-configuration is provided in an embodiment of the present disclosure, the method is performed by the UE, and may include: receiving the deactivation measurement gap indication information is received. The deactivation measurement gap indication information is configured to indicate at least one measurement object for which the UE does not need the measurement gap on the configured BWP.

A method for processing measurement gap pre-configuration is provided in an embodiment of the present disclosure, the method is performed by the UE, and may include: receiving the deactivation measurement gap indication information is received. The deactivation measurement gap indication information is configured to deactivate the measurement gap of the measurement object on the configured BWP for the UE.

In the embodiment of the present disclosure, for deactivating the measurement gap on the configured BWP for the UE, it is required to configure the measurement gap for the measurement object on the configured BWP for the UE. In this way, in the embodiment of the present disclosure, the measurement gap may be first configured for the measurement object on the configured BWP for the UE, and the measurement gap of the measurement object is deactivated, so that the measurement gap of the measurement object can be deactivated in advance, thereby improving the measurement efficiency of the UE.

Receiving the deactivation measurement gap indication information herein may be: receiving the deactivation measurement gap indication information sent by a base station.

The deactivation measurement gap indication information herein may be configured to indicate the at least one measurement object for which the UE does not need the measurement gap in all or a part of measurement objects on the configured BWP.

For example, there may be 4 BWPs, which are: BWP 1, BWP 2, BWP 3, and BWP 4, respectively. There are q measurement objects in each of the four target objects, where an i-th measurement object may be represented by $MO\_i$, and a j-th measurement object may be represented by $MO\_j$, i and j are both less than q.

For example, the activation measurement gap indication information may be configured to indicate a measurement object for which the measurement gap is configured in the measurement objects in the four BWPs. For another example, the deactivation measurement gap indication information may be configured to indicate a measurement object for which the measurement gap is not configured in the measurement objects in the four BWPs. For example, the activation measurement gap indication information is configured to indicate the i-th measurement object for which the measurement gap is configured. The deactivation measurement gap indication information may be configured to indicate that the j-th measurement object for which the measurement gap is not configured.

For another example, the activation measurement gap indication information is configured to activate the measurement gaps of the measurement objects in the four BWPs. The deactivation measurement indication information is configured to deactivate the measurement gaps of the measurement objects in the four BWPs. For example, activation=$\{Mo\_i\}$ is configured to activate the measurement gap of the i-th measurement object, so that the measurement gap is needed when the i-th measurement object is measured. For another example, deactivation=$\{Mo\_j\}$ is configured to deactivate the measurement gap of the j-th measurement object, so that the measurement gap is not needed when the j-th measurement object is measured. Each of i, j, and q herein is an integer greater than 0.

In the above examples, each BWP may not necessarily have q measurement objects, and the measurement objects in each BWP may be the same or different. For example, there may be g measurement objects in the BWP 1, there may be q measurement objects in the BWP 2, there may be z measurement objects in the BWP 3, and there may be q measurement objects in the BWP 4. Here, each of g, q, and z is an integer greater than or equal to i, and each of g, q, and z is an integer greater than or equal to j.

In the embodiment of the present disclosure, the activation measurement gap indication information may be configured to indicate the measurement object for which the measurement gap is configured and/or activate the measurement gap of the measurement object; and/or the deactivation measurement gap indication information may be configured to indicate the measurement object for which the measurement gap is not configured and/or deactivate the measurement gap of the measurement object.

In an embodiment, one measurement object includes one measurement carrier. For example, the activation measurement gap indication information is configured to indicate at least one measurement carrier for which the UE needs the measurement gap on the configured BWP. As another example, the deactivation measurement gap indication information is configured to indicate at least one measurement carrier for which the UE does not need the measurement gap on the configured BWP.

A method for processing measurement gap pre-configuration is provided in an embodiment of the present disclosure, the method is performed by the UE, and may include: determining whether the UE needs the measurement gap on the configured BWP based on the measurement gap indication information.

A method for processing measurement gap pre-configuration is provided in an embodiment of the present disclosure, the method is performed by the UE, and may include: determining at least one measurement object for which the UE needs the measurement gap on the configured BWP based on the activation measurement gap indication information.

A method for processing measurement gap pre-configuration is provided in an embodiment of the present disclosure, the method is performed by the UE, and may include: determining at least one measurement object for which the UE does not need the measurement gap on the configured BWP based on the deactivation measurement gap indication information.

In an embodiment, the measurement performed by the UE includes, but is not limited to, at least one of an RRM measurement or a mobility measurement. The mobility measurement herein includes an SSB measurement and/or a CSI-RS measurement.

In the embodiments of the present disclosure, the UE may determine whether the UE needs the measurement gap on the configured BWP based on the measurement gap indication information. More specifically, based on the activation measurement gap indication information, the measurement object for which the UE needs the measurement gap on the configured BWP for the UE may be determined and/or the measurement gap of the measurement object may be activated, and/or based on the deactivation measurement gap indication information, the measurement object for which the UE does not need the measurement gap on the configured BWP for the UE may be determined and/or the measurement gap of the measurement object may be deactivated.

Therefore, in the embodiments of the present disclosure, the UE may know whether the measurement gap is needed for all measurement objects on the configured BWP for the UE in advance (i.e., including the measurement object for which the measurement gap needs to or not to be configured on the configured BWP for the UE, and activating or deactivating the measurement gap of the measurement object configured for the UE). In this way, when the UE is switched to the configured BWP, the UE may use or not use the measurement gap for the measurement object on the configured BWP based on the activation measurement gap indication information or the deactivation measurement gap indication information. That is, the UE may measure the measurement object for which the measurement gap activated based on the measurement gap and measure the measurement object for which the measurement gap is deactivated without based on the measurement gap. Therefore, the measurement efficiency of the UE and the throughput of the UE may also be improved.

It should be noted that, those skilled in the art may understand that the method provided in the embodiments of the present disclosure may be executed separately, or may also be executed together with other methods in the embodiments of the present disclosure or some methods in the related art.

A method for processing measurement gap pre-configuration is provided in an embodiment of the present disclosure, the method is performed by the UE, and includes:

receiving measurement gap indication information, before switching an activated BWP of the UE. The measurement gap indication information is configured to indicate whether the UE needs the measurement gap on the configured BWP.

In some embodiments of the present disclosure, the measurement gap indication information may be the measurement gap indication information described in step S31.

In some embodiments, step S31 includes: receiving the measurement gap indication information, before switching the activated BWP of the UE. The measurement gap indication information is configured to indicate whether the UE needs the measurement gap on the configured BWP.

A method for processing measurement gap pre-configuration is provided in an embodiment of the present disclosure, the method is performed by the UE, and may include: receiving activation measurement gap indication information, before switching the activated BWP of the UE. The activation measurement gap indication information is configured to indicate at least one measurement object for which the UE needs the measurement gap on the configured BWP.

A method for processing measurement gap pre-configuration is provided in an embodiment of the present disclosure, the method is performed by the UE, and may include: receiving activation measurement gap indication information, before switching the activated BWP of the UE. The activation measurement gap indication information is configured to activate the measurement gap of the measurement object on the configured BWP for the UE.

A method for processing measurement gap pre-configuration is provided in an embodiment of the present disclosure, the method is performed by the UE, and may include: receiving deactivation measurement gap indication information, in response to before switching the activated BWP of the UE. The deactivation measurement gap indication information is configured to indicate at least one measurement object for which the UE does not need the measurement gap on the configured BWP.

A method for processing measurement gap pre-configuration is provided in an embodiment of the present disclosure, the method is performed by the UE, and may include: receiving deactivation measurement gap indication information, in response to before switching the activated BWP of the UE. The deactivation measurement gap indication information is configured to deactivate the measurement gap of the measurement object on the configured BWP for the UE.

In the embodiment of the present disclosure, the UE may receive the measurement gap indication information before switching the activated BWP of the UE. The UE may know whether the measurement gap is configured for the measurement object on the configured BWP for the UE and whether to activate the measurement gap of the measurement object on the configured BWP for the UE, so that the UE needs not to determine whether the measurement gap is configured for the measurement object on the BWP and whether to activate the measurement gap at the last moment, thereby improving the measurement efficiency of the UE.

It should be noted that, those skilled in the art may understand that the method provided in the embodiments of the present disclosure may be executed separately, or may also be executed together with other methods in the embodiments of the present disclosure or some methods in the related art.

A method for processing measurement gap pre-configuration is provided in an embodiment of the present disclosure, the method is performed by the UE, and includes: receiving a RRC layer signaling. The measurement gap indication information is carried in the RRC layer signaling.

In an embodiment, the RRC layer signaling may be sent once. For example, the RRC layer signaling is sent, and the measurement gap indication information carried in the RRC layer signaling is configured to indicate whether the UE needs the measurement gap on the configured BWP and whether to activate the measurement gap on the configured BWP for the UE.

In another embodiment, the RRC layer signaling may be sent twice. For example, a first RRC layer signaling and a second RRC layer signaling are sent. The measurement gap indication information carried in the first RRC layer signaling is configured to indicate whether the UE needs the measurement gap on the configured BWP. The measurement gap indication information carried in the second RRC layer signaling is configured to determine whether to activate the measurement gap on the configured BWP for the UE.

A method for processing measurement gap pre-configuration is provided in an embodiment of the present disclosure, the method is performed by the UE, and includes: receiving a measurement gap configuration (MeasGapConfig) signaling. The measurement gap indication information is carried in the MeasGapConfig signaling.

As shown in FIG. 4, a method for processing measurement gap pre-configuration is provided in an embodiment of the present disclosure, the method is performed by a UE, and includes step S41.

At step S41, a measurement gap configuration (MeasGapConfig) signaling is received, activation measurement gap indication information is carried in the MeasGapConfig signaling; and/or, a measurement gap configuration (MeasGapConfig) MeasGapConfig signaling is received, deactivation measurement gap indication information is carried in the MeasGapConfig signaling.

In some embodiments of the present disclosure, the activation measurement gap indication information may be the activation measurement gap indication information described in step S31, and the deactivation measurement gap indication information may be the deactivation measurement gap indication information described in step S31.

In an embodiment, receiving the MeasGapConfig signaling includes: receiving the MeasGapConfig signaling sent by a base station. The activation measurement gap indication information and/or the deactivation measurement gap indication information is carried in the MeasGapConfig signaling.

In an embodiment, step S31 includes at least one of the following:
   receiving the MeasGapConfig signaling, in which the activation measurement gap indication information is carried in the MeasGapConfig signaling; or
   receiving the MeasGapConfig signaling, in which the deactivation measurement gap indication information is carried in the MeasGapConfig signaling.

In the embodiments of the present disclosure, the activation measurement gap indication information and/or the deactivation measurement gap indication information may be received based on the MeasGapConfig signaling, so that a utilization rate of the MeasGapConfig signaling can be improved.

In addition, in the embodiments of the present disclosure, since the situation where the measurement gap is needed for the measurement object on the configured BWP for the UE can be known in advance, even if there is a certain delay in sending the activation measurement gap indication information and/or the deactivation measurement gap indication information based on the MeasGapConfig signaling, the measurement gap of the measurement object on the configured BWP for the UE may be activated before the UE performs the switching. Therefore, measurement success rate and measurement efficiency of the UE can be greatly improved.

It should be noted that, those skilled in the art may understand that the method provided in the embodiments of the present disclosure may be executed separately, or may also be executed together with other methods in the embodiments of the present disclosure or some methods in the related art.

A method for processing measurement pre-configuration is provided in an embodiment of the present disclosure, the method is performed by the UE, and may include:
   receiving measurement configuration information for measurement, in which the measurement configuration information is configured to instruct the UE to perform the measurement on a configured BWP.

In an embodiment, receiving the measurement configuration information for the measurement includes: receiving the measurement configuration information for the measurement sent by a base station.

In this way, in the embodiments of the present disclosure, the UE may receive the measurement configuration information sent by the base station, and may determine that the UE may perform the measurement.

A method for processing measurement pre-configuration is provided in an embodiment the present disclosure, the method is performed by the UE, and may include: receiving a RRC message. The measurement configuration information is carried in the RRC message.

A method for processing measurement gap pre-configuration is provided in an embodiment the present disclosure, the method is performed by the UE, and may include: receiving a radio resource control reconfiguration (RRCReconfiguration) message. The measurement configuration information is carried in the RRCReconfiguration message.

In an embodiment, receiving the RRCReconfiguration message may include: receiving the RRCReconfiguration message sent by the base station.

A method for processing measurement gap pre-configuration is provided in an embodiment of the present disclosure, the method is performed by the UE, and may include: receiving a measurement configuration (measConfig) signaling. The measurement configuration information is carried in the measConfig signaling.

In an embodiment, receiving the measConfig signaling may include: receiving the measConfig signaling sent by the base station.

Here, the measConfig signaling is a signaling in the RRCReconfiguration message.

In this way, in the embodiment of the present disclosure, the measurement configuration information for measurement may be sent based on the RRCReconfiguration message or the measConfig signaling in the RRCReconfiguration message. It can be applied to a scenario in which the UE performs the measurement when reconnecting.

A method for processing measurement gap pre-configuration is provided in an embodiment of the present disclosure, the method is performed by the UE, and may include: receiving a RRC layer signaling. Information configured to indicate the configured BWPs for the UE and/or a maximum number of the configured BWPs is carried in the RRC layer signaling.

A method for processing measurement gap pre-configuration is provided in an embodiment the present disclosure, the method is performed by the UE, and may include: receiving a downlink bandwidth part information element (IE BWP-Downlink) signaling. The IE BWP-downlink signaling is configured to indicate the configured BWP for the UE.

In an embodiment, a bwp-Id field of the IE BWP-Downlink signaling is configured to indicate the maximum number of the configured BWPs for the UE.

In an embodiment, the maximum number of the configured BWPs for the UE is 4. For example, maxNrofBWPs may be carried in the bwp-Id field, and maxNrofBWP is configured to indicate that a number of the configured BWPs for the UE is 4. In other embodiments, the maximum number of the configured BWPs for the UE may be indicated to be 3, 2, or 6, etc., via the bwp-Id field, which is not limited herein.

In this way, in the embodiments of the present disclosure, the UE may accurately know the configured BWPs and/or the maximum number of the configured BWPs when the UE performs the measurement based on the received IE BWP-Downlink signaling, etc., so that the UE can know the BWP that the UE can switch to, and facilitate performing measurement by the UE on a reference signal on the switched BWP based on or not based on the measurement gap.

It should be noted that, those skilled in the art may understand that a method provided in the embodiments of the present disclosure may be executed separately, or may also be executed with other methods in the embodiments of the present disclosure or some methods in the related art.

The following describes a method for processing measurement gap pre-configuration applied to a base station, which is similar to the description of the above method for processing measurement gap pre-configuration applied to the UE. For the technical details not disclosed in the method for processing measurement gap pre-configuration applied to the base station in the embodiments, please refer to the description of the example of the method for processing measurement gap pre-configuration applied to the UE, which is not described in detail herein.

As shown in FIG. 5, a method for processing measurement gap pre-configuration is provided in an embodiment of the present disclosure, the method is performed by a base station, and includes step S51.

At step S51, measurement gap indication information is sent, the measurement gap indication information is configured to indicate whether the UE needs a measurement gap on a configured BWP.

In some embodiments of the present disclosure, the measurement gap indication information may be the measurement gap indication information described in step S31.

In an embodiment, sending the measurement gap indication information includes: sending the measurement gap indication information to the UE.

A method for processing measurement gap pre-configuration is provided in an embodiment of the present disclosure, the method is performed by the base station, and may include: sending the measurement gap indication information. The measurement gap indication information is configured to indicate whether the UE needs the measurement gap on a part of the configured BWP. The measurement gap indication information is used when an activated BWP is switched.

In an embodiment, the measurement gap indication information includes:

activation measurement gap indication information, configured to indicate at least one measurement object for which the UE needs the measurement gap on the configured BWP;

deactivation measurement gap indication information, configured to indicate at least one measurement object for which the UE does not need the measurement gap on the configured BWP.

In some embodiments of the present disclosure, the activation measurement gap indication information may be the activation measurement gap indication information described in step S31, and the deactivation measurement gap indication information may be the deactivation measurement gap indication information described in step S31.

A method for processing measurement gap pre-configuration is provided in an embodiment of the present disclosure, the method is performed by the base station, and may include: sending the activation measurement gap indication information. The activation measurement gap indication information is configured to indicate at least one measurement object for which the UE needs the measurement gap on the configured BWP.

A method for processing measurement gap pre-configuration is provided in an embodiment of the present disclosure, the method is performed by the base station, and may include: sending the deactivation measurement gap indication information. The deactivation measurement gap indication information is configured to indicate at least one measurement object for which the UE does not need the measurement gap on the configured BWP.

The measurement gap indication information includes at least one of the following:

activation measurement gap indication information, configured to activate a measurement gap of a measurement object on the configured BWP for the UE; or deactivation measurement gap indication information, configured to deactivate a measurement gap of the measurement object on the configured BWP for the UE.

A method for processing measurement gap pre-configuration is provided in an embodiment of the present disclosure, the method is performed by the base station, and may include: sending the activation measurement gap indication information. The activation measurement gap indication information is configured to activate the measurement gap of the measurement object on the configured BWP for the UE.

A method for processing measurement gap pre-configuration is provided in an embodiment of the present disclosure, the method is performed by the base station, and may include: sending the deactivation measurement gap indication information. The deactivation measurement gap indication information is configured to deactivate the measurement gap of the measurement object on the configured BWP for the UE.

A method for processing measurement gap pre-configuration is provided in an embodiment of the present disclosure, the method is performed by the base station, and may include: sending a RRC layer signaling. The activation measurement gap indication information and/or the deactivation measurement gap indication information is carried in the RRC layer signaling.

A method for processing measurement gap pre-configuration is provided in an embodiment of the present disclosure, the method is performed by the base station, and may include: sending a MeasGapConfig signaling. The activation measurement gap indication information and/or the deactivation measurement gap indication information is carried in the MeasGapConfig signaling.

In an embodiment, step S51 includes at least one of the following:

sending the MeasGapConfig signaling, in which the activation measurement gap indication information is carried in the MeasGapConfig signaling; or sending the MeasGapConfig signaling, in which the deactivation measurement gap indication information is carried in the MeasGapConfig signaling.

Figures 6, 7:
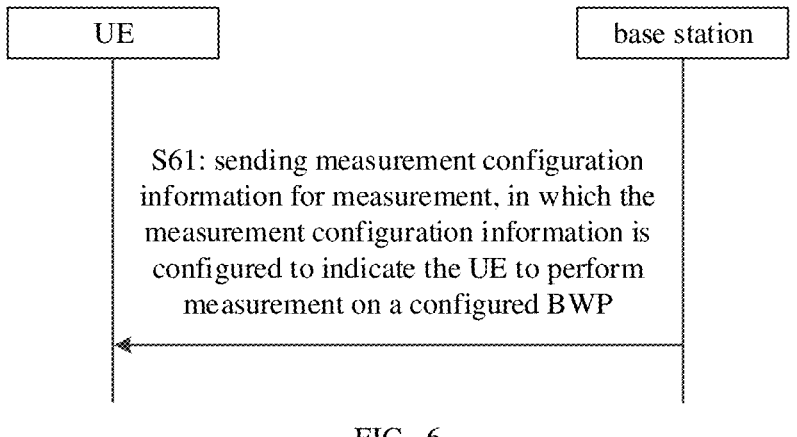
FIG. 6 is a flowchart illustrating a method for processing measurement gap pre-configuration according to an example embodiment.
FIG. 7 is a flowchart illustrating a method for processing measurement gap pre-configuration according to an example embodiment.

As shown in FIG. 6, a method for processing measurement gap pre-configuration is provided in an embodiment of the present disclosure, the method is performed by a base station, and includes step S61.

At step S61, measurement configuration information for measurement is sent, the measurement configuration information is configured to instruct the UE to perform the measurement on a configured BWP.

A method for processing measurement gap pre-configuration is provided in an embodiment of the present disclosure, the method is performed by the base station, and may include: sending an RRCReconfiguration message. The measurement configuration information is carried in the RRCReconfiguration message.

A method for processing measurement gap pre-configuration is provided in an embodiment of the present disclosure, the method is performed by the base station, and may include: sending a measurement configuration (measConfig) signaling. The measurement configuration information is carried in the measConfig signaling.

In an embodiment, step S61 includes one of the following:

sending the RRCReconfiguration message, in which the measurement configuration information is carried in the RRCReconfiguration message; or sending the measConfig signaling, in which the measurement configuration information is carried in the measGapConfig signaling.

As shown in FIG. 7, a method for processing measurement gap pre-configuration is provided in an embodiment of the present disclosure, the method is performed by a base station, and includes step S71.

At step S71, an IE BWP-Downlink signaling is sent, the IE BWP-Downlink signaling is configured to indicate the configured BWP for the UE.

In an embodiment, a bwp-Id field of the IE BWP-Downlink signaling is configured to indicate a maximum number of configured BWPs for the UE.

In an embodiment, the maximum number of the configured BWPs for the UE is 4. For example, maxNrofBWPs may be carried in the bwp-Id field, and maxNrofBWP is configured to indicate that the number of the configured BWPs for the UE is 4. In other embodiments, the maximum number of the configured BWPs for the UE may be indicated to be 3, 2, or 6, etc., via the bwp-Id field, which is not limited herein.

It should be noted that, those skilled in the art may understand that an apparatus provided in the embodiments of the present disclosure may be used separately, or may also be used with other apparatuses in the embodiments of the present disclosure or some apparatuses in the related art.

In order to further explain any embodiment of the present disclosure, the following examples is provided for description.

Example 1

Figures 8, 9, 10:
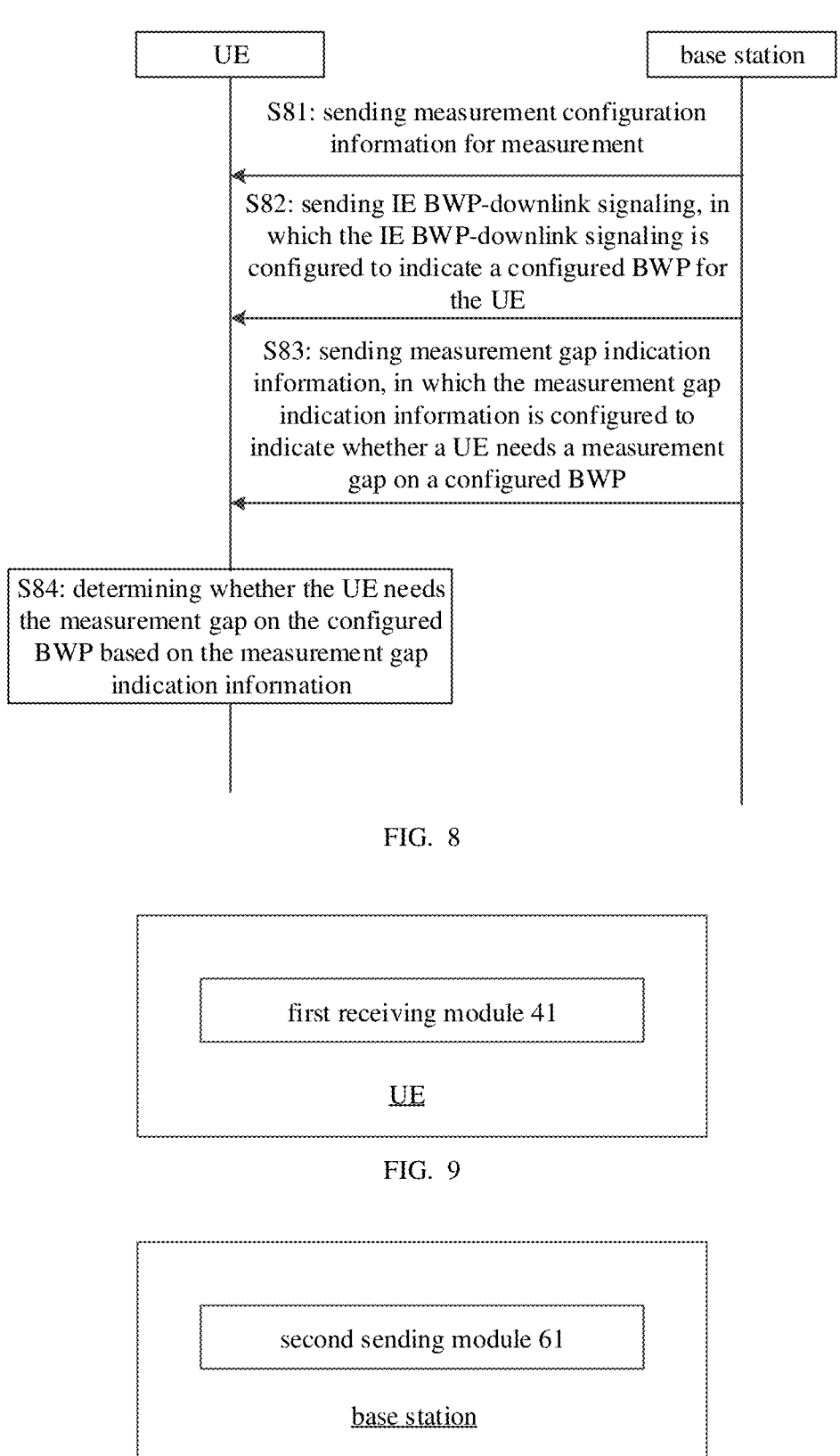
FIG. 8 is a flowchart illustrating a method for processing measurement gap pre-configuration according to an example embodiment.
FIG. 9 is a block diagram illustrating an apparatus for processing measurement gap pre-configuration according to an example embodiment.
FIG. 10 is a block diagram illustrating an apparatus for processing measurement gap pre-configuration according to an example embodiment.

As shown in FIG. 8, a method for processing measurement gap pre-configuration is provided in an embodiment of the present disclosure. The method is performed by a measurement gap processing system, the system includes a UE and a base station. The method includes steps S81 to S84.

At step S81, measurement configuration information for measurement is sent.

In an embodiment, the base station sends the measurement configuration information to the UE based on a measConfig signaling in an RRCReconfiguration message. The measurement configuration information is configured to instruct the UE to perform the measurement on a configured BWP.

At step S82, an IE BWP-Downlink signaling is sent, the IE BWP-Downlink signaling is configured to indicate the configured BWP for the UE.

In an embodiment, the base station sends the IE BWP-Downlink signaling to the UE. The IE BWP-Downlink signaling is configured to indicate the configured BWP for the UE, a bwp-Id field of the IE BWP-Downlink signaling is configured to indicate a maximum number of the configured BWPs for the UE.

At step S83, measurement gap indication information is sent, the measurement gap indication information is configured to indicate whether the UE needs a measurement gap on the configured BWP.

In an embodiment, the measurement gap indication information includes: activation measurement gap indication information configured to indicate at least one measurement object for which the UE needs the measurement gap on the configured BWP; and/or deactivation measurement gap indication information configured to indicate at least one measurement object for which the UE does not need the measurement gap on the configured BWP.

In an embodiment, the base station sends the MeasGapConfig signaling to the UE, the activation measurement gap indication information carried in the MeasGapConfig signaling is configured to indicate at least one measurement object for which the UE needs the measurement gap on the configured BWP; and/or, the deactivation measurement gap indication information carried in the MeasGapConfig signaling is configured to indicate at least one measurement object for which the UE does not need the measurement gap on the configured BWP.

In an embodiment, the base station sends the MeasGapConfig signaling to the UE, the activation measurement gap indication information carried in the MeasGapConfig signaling is configured to activate the measurement gap of the measurement object on the configured BWP for the UE; and/or, the deactivation measurement gap indication information carried in the MeasGapConfig signaling is configured to deactivate the measurement gap of the measurement object on the configured BWP for the UE.

At step S84, whether the UE needs the measurement gap n the configured BWP is determined based on the measurement gap indication information.

In an embodiment, the UE receives the MeasGapConfig signaling sent by the base station, and determines at least one measurement object for which the UE needs the measurement gap on the configured BWP based on the activation measurement gap indication information carried in the MeasGapConfig signaling; and/or determines at least one measurement object for which the UE does not need the measurement gap on the configured BWP based on the deactivation measurement gap indication information carried in the MeasGapConfig signaling.

In the embodiment of the present disclosure, the measurement gap indication information may be sent to the UE by the base station. The UE may know whether the UE needs the measurement gaps for all measurement objects on the configured BWP for the UE in advance (i.e., including the measurement object for which the measurement gap is needed or not needed on the configured BWP for the UE, and activating or deactivating the measurement gap of the measurement object configured for the UE). Thus, the measurement gap of the measurement object configured for the UE may be activated in advance, which improves measurement efficiency of the UE.

Moreover, with the embodiments of the present disclosure, the UE may measure the measurement object for which the measurement gap is activated based on the measurement gap and measure the measurement object for which the measurement gap is deactivated without based on the measurement gap. Therefore, the measurement efficiency of the UE and the throughput of the UE may also be improved.

In addition, in the embodiments of the present disclosure, since the measurement gap indication information is sent by the base station, the UE may configure the measurement gap of the measurement object in advance and activate the measurement gap of the measurement object in advance. Therefore, even if there is a certain delay in sending the activation measurement gap indication information and/or the deactivation measurement gap indication information based on the MeasGapConfig signaling, a success rate of performing a reference signal measurement by the UE can be greatly improved, and efficiency of the reference signal measurement can be improved.

As shown in FIG. 9, an apparatus for processing measurement gap pre-configuration is provided in an embodiment of the present disclosure. The apparatus is applied to a UE, and includes a first receiving module 41.

The first receiving module 41 is configured to receive measurement gap indication information. The measurement gap indication information is configured to indicate whether the UE needs a measurement gap on a configured BWP.

In an embodiment, the measurement gap indication information includes at least one of the following:

activation measurement gap indication information, configured to indicate at least one measurement object for which the UE needs the measurement gap on the configured BWP; or deactivation measurement gap indication information, configured to indicate at least one measurement object for which the UE does not need the measurement gap on the configured BWP.

An apparatus for processing measurement gap pre-configuration is provided in an embodiment of the present disclosure, the apparatus is applied to the UE, and may include: a first receiving module 41 configured to receive the activation measurement gap indication information. The activation measurement gap indication information is configured to indicate at least one measurement object for which the UE needs the measurement gap on the configured BWP.

An apparatus for processing measurement gap pre-configuration is provided in an embodiment of the present disclosure, the apparatus is applied to the UE, and may include: a first receiving module 41 configured to receive the deactivation measurement gap indication information. The deactivation measurement gap indication information is configured to indicate at least one measurement object for which the UE does not need the measurement gap on the configured BWP.

In an embodiment, the measurement gap indication information includes at least one of the following:

activation measurement gap indication information, configured to activate a measurement gap of a measurement object on the configured BWP for the UE; or deactivation measurement gap indication information, configured to deactivate a measurement gap of a measurement object on the configured BWP for the UE.

In an embodiment, a measurement object includes a carrier.

An apparatus for processing measurement gap pre-configuration is provided in an embodiment of the present disclosure. The apparatus is applied to the UE, and may include:

a first receiving module 41 configured to receive a MeasGapConfig signaling, in which the activation measurement gap indication information is carried in the MeasGapConfig signaling;

and/or, a first receiving module 41 configured to a MeasGapConfig signaling is received, in which the deactivation measurement gap indication information is carried in the MeasGapConfig signaling.

An apparatus for processing measurement gap pre-configuration is provided in an embodiment of the present disclosure, the apparatus is applied to the UE, and may include: a first receiving module 41, configured to receive measurement configuration information. The measurement configuration information is configured to instruct the UE to perform the measurement on the configured BWP.

An apparatus for processing measurement gap pre-configuration is provided in an embodiment the present disclosure, the apparatus is applied to the UE, and may include: a first receiving module 41, configured to receive an RRCReconfiguration message. The measurement configuration information is carried in the RRCReconfiguration message.

An apparatus for processing measurement gap pre-configuration is provided in an embodiment of the present disclosure, the apparatus is applied to the UE, and may include: a first receiving module 41, configured to receive a measConfig signaling. The measurement configuration information is carried in the measConfig signaling.

An apparatus for processing measurement gap pre-configuration is provided in an embodiment the present disclosure, the apparatus is applied to the UE, and may include: a first receiving module 41, configured to receive an IE BWP-Downlink signaling. The IE BWP-Downlink signaling is configured to indicate the configured BWP for the UE.

In an embodiment, a bwp-Id field of the IE BWP-Downlink signaling is configured to indicate a maximum number of the configured BWPs for the UE.

It should be noted that, those skilled in the art may understand that apparatus provided in the embodiments of the present disclosure may be used separately, or may also be used with other apparatuses in the embodiments of the present disclosure or some apparatuses in the related art.

With regard to the apparatus in the above embodiments, the specific way in which each module performs the operation has been described in detail in the embodiments of the method and will not be elaborated here.

As shown in FIG. 10, an apparatus for processing measurement gap pre-configuration is provided in an embodiment of the present disclosure. The apparatus is applied to a base station, and includes a second sending module 61.

The second sending module 61 is configured to send measurement gap indication information. The measurement gap indication information is configured to indicate whether a UE needs a measurement gap on a configured BWP.

In an embodiment, the measurement gap indication information includes:

activation measurement gap indication information, configured to indicate at least one measurement object for which the UE needs the measurement gap on the configured BWP; or deactivation measurement gap indication information, configured to indicate at least one measurement object for which the UE does not need the measurement gap on the configured BWP.

An apparatus for processing measurement gap pre-configuration is provided in an embodiment of the present disclosure, the apparatus is applied to the base station, and may include: a second sending module 61 configured to send the activation measurement gap indication information. The activation measurement gap indication information is configured to indicate at least one measurement object for which the UE needs the measurement gap on the configured BWP.

An apparatus for processing measurement gap pre-configuration is provided in an embodiment of the present disclosure, the apparatus is applied to the base station, and may include: a second sending module 61 configured to send the deactivation measurement gap indication information. The deactivation measurement gap indication information is configured to indicate at least one measurement object for which the UE does not need the measurement gap on the configured BWP.

In an embodiment, the measurement gap indication information includes at least one of the following:

activation measurement gap indication information, configured to activate a measurement gap of a measurement object on the configured BWP for the UE; or deactivation measurement gap indication information, configured to deactivate a measurement gap of the measurement object on the configured BWP for the UE.

An apparatus for processing measurement gap pre-configuration is provided in an embodiment of the present disclosure, the apparatus is applied to the base station, and may include: a second sending module 61 configured to send a MeasGapConfig signaling, in which the active measurement gap indication information is carried in the MeasGapConfig signaling; and/or a second sending module 61 configured to send a MeasGapConfig signaling, in which the deactivation measurement gap indication information is carried in the MeasGapConfig signaling.

An apparatus for processing measurement gap pre-configuration is provided in an embodiment of the present disclosure, the apparatus is applied to the base station, and may include: a second sending module 61 configured to send measurement configuration information. The measurement configuration information is configured to instruct the UE to perform the measurement on the configured BWP.

An apparatus for processing measurement gap pre-configuration is provided in an embodiment the present disclosure, the apparatus is applied to the base station, and may include: a second sending module 61 configured to send an RRCReconfiguration message, in which the measurement configuration information is carried in the RRCReconfiguration message; or a second sending module 61 configured to send a measConfig signaling, in which the measurement configuration information is carried in the measConfig signaling.

An apparatus for processing measurement gap pre-configuration is provided in an embodiment the present disclosure, the apparatus is applied to the base station, and may include: a second sending module 61 configured to send an IE BWP-Downlink signaling. The IE BWP-Downlink signaling is configured to indicate the configured BWP for the UE.

In an embodiment, a bwp-Id field of the IE BWP-Downlink signaling is configured to indicate a maximum number of the configured BWPs for the UE.

It should be noted that, those skilled in the art may understand that apparatus provided in the embodiments of the present disclosure may be used separately, or may also be used with other apparatuses in the embodiments of the present disclosure or some apparatuses in the related art.

With regard to the apparatus in the above embodiments, the specific way in which each module performs the operation has been described in detail in the embodiments of the method and will not be elaborated here.

A communication device is provided in the embodiments of the present disclosure. The communication device includes:

a processor;

a memory configured to store instructions executable by the processor;

the processor being configured to implement the method for processing measurement gap pre-configuration according to any of the embodiments in the present disclosure.

In an embodiment, the communication device may be a UE or a base station.

The processor may include various types of storage media, the storage medium is a non-transitory computer storage medium, may continue to memorize the information stored thereon after the user equipment is powered down.

The processor may be connected to the memory via a bus or the like, is configured to read the executable program stored on the memory, for example, at least one of the methods shown of FIGS. 3 to 8.

According to the embodiments of the present disclosure, a computer storage medium with a computer executable program stored thereon is further provided. The method for processing measurement gap pre-configuration according to any embodiment of the present disclosure, for example, at least one of the methods shown in FIGS. 3 to 8, is implemented, when the executable program is executed by the processor.

With regard to the apparatus or the storage medium in the above embodiments, the specific way in which each module performs the operation has been described in detail in the embodiments of the method and will not be elaborated here.

Figure 11:
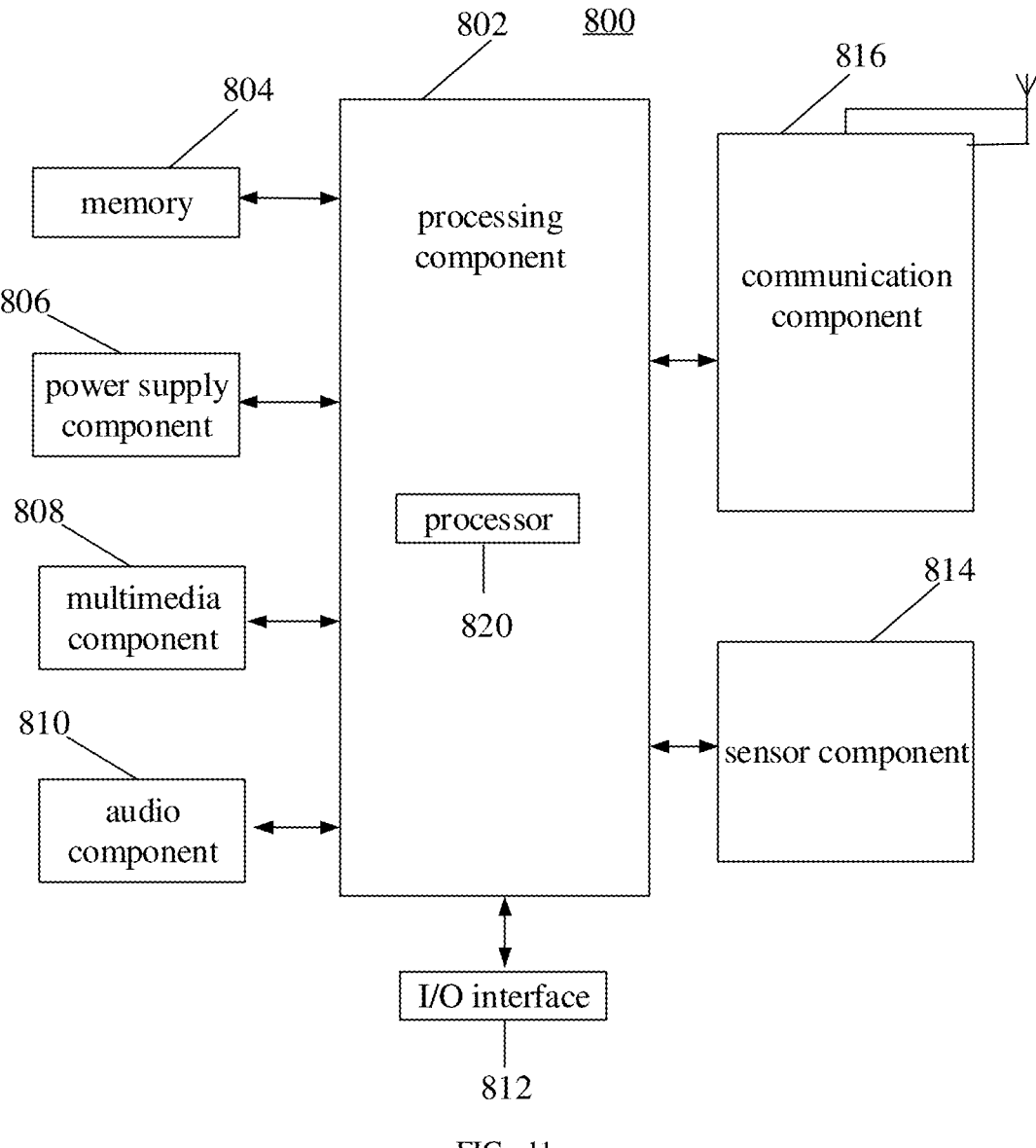
FIG. 11 is a block diagram illustrating a UE according to an example embodiment.

FIG. 11 is a block diagram illustrating a user equipment 800 according to an example embodiment. For example, the user equipment 800 may be a mobile phone, a computer, a digital broadcasting user equipment, a messaging device, a game console, a tablet device, a medical equipment, a fitness equipment, a personal digital assistant, etc.

As illustrated in FIG. 11, the user equipment 800 may include one or more components: a processing component 802, a memory 804, a power supply component 806, a multimedia component 808, an audio component 810, an input/output (I/O) interface 812, a sensor component 814, and a communication component 816.

The processing component 802 generally controls the whole operation of the user equipment 800, such as the operations related to display, phone call, data communication, camera operation and recording operation. The processing component 802 may include one or more processors 820 to perform instructions, to complete all or part of steps of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the user equipment 800. Examples of the data include the instructions of any applications or methods operated on user equipment 800, contact data, phone book data, messages, pictures, videos, etc. The memory 804 may be implemented by any type of volatile or non-volatile storage devices or their combination, such as a stationary random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 may provide power for all components of the user equipment 800. The power supply component 806 may include power supply management system, one or more power supplies, and other units related to generating, managing and distributing power for the user equipment 800.

The multimedia component 808 includes an output interface screen provided between the user equipment 800 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 808 includes a front camera and/or a rear camera. When the user equipment 800 is in operation mode, such as shooting mode or video mode, the front camera or the rear camera may receive the external multimedia data. Each front camera and rear camera may be a fixed optical lens system or an optical lens system with focal length and optical zoom capacity.

The audio component 810 is configured as an output and/or input signal. For example, the audio component 810 includes a microphone (MIC). When the user equipment 800 is in operation mode, such as call mode, record mode, and speech recognition mode, the microphone is configured to receive the external audio signals. The audio signals received may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes one or more sensors, configured to provide various aspects of status assessment for the user equipment 800. For example, the sensor component 814 may detect the on/off state of the user equipment 800 and the relative positioning of the component. For example, the component is a display and a keypad of the user equipment 800. The sensor component 814 may further detect the location change of the electronic user equipment 800 or one component of the user equipment 800, the presence or absence of contact between the user and the user equipment 800, the orientation or acceleration/deceleration of the user equipment 800, and the temperature change of the user equipment 800. The sensor component 814 may include a proximity sensor, which is configured to detect the existence of the objects nearby without any physical contact. The sensor component 814 may further include a light sensor such as CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the user equipment 800 and other devices. The user equipment 800 may access wireless networks based on communication standard, such as Wi-Fi, 2G or 3G, or their combination. In an exemplary embodiment, the communication component 816 receives broadcast signals or broadcast-related information from an external broadcast management system via a broadcast channel. In an exemplary embodiment, the communication component 816 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an example embodiment, the user equipment 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-temporary computer readable storage medium is further provided which includes instructions, such as the memory 804 including instructions, in which the instructions may be executed by the processor 820 of the user equipment 800 to complete the above methods. For example, the non-transitory computer readable storage medium may be a ROM, a random access memory (RAM), a CD-ROM, a magnetic tape, a floppy disk, an optical data storage device, etc.

Figure 12:
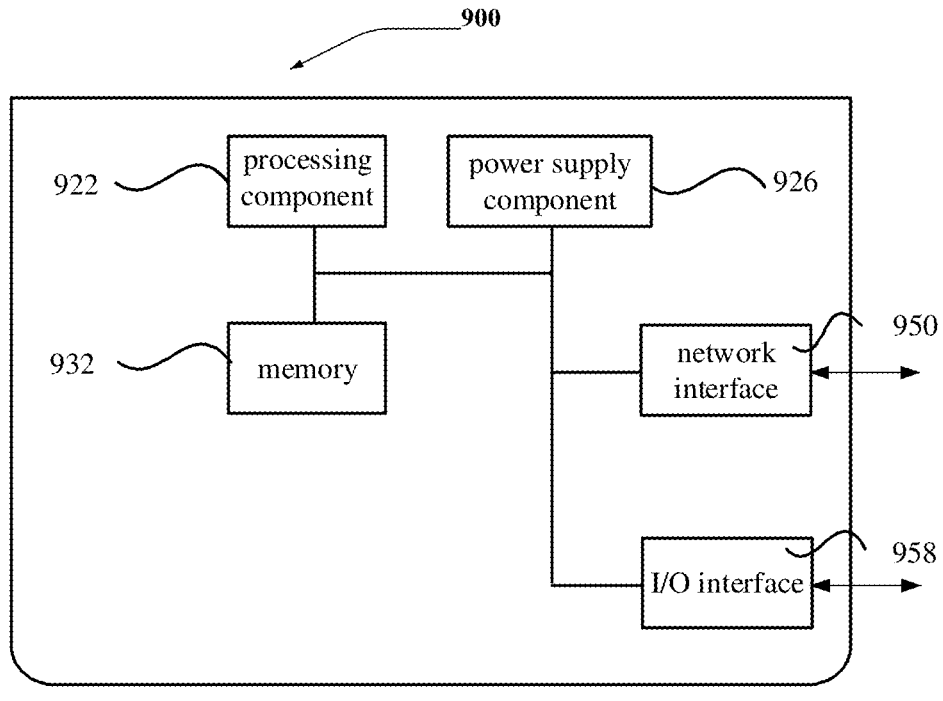
FIG. 12 is a block diagram illustrating a base station according to an example embodiment.

As shown in FIG. 12, a structure of a base station is illustrated in an embodiment of the present disclosure. For example, the base station 900 may be provided as a network side device. Referring to FIG. 12, the base station 900 includes a processing component 922, which further include one or more processors, and memory resources represented by a memory 932, which is configured to store instructions executed by the processing component 922, for example, an application. The applications stored in the memory 932 may include one or more modules each of which corresponds to a set of instructions. In addition, the processing component 922 is configured to execute instructions, to execute any of the methods described above applied to the base station.

The base station 900 may further include one power supply component 926 configured to execute power management of the base station 900, and one wired or wireless network interface 950 configured to connect the base station 900 to a network, and one input/output (I/O) interface 958. The base station 900 may operate an operating system stored in the memory 932, for example, Windows Server™, Mac OS X™, Unix™, Linux™, FreeBSD™ or the like.

After considering the specification and practicing the disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present invention is not limited to the precise structure described above and shown in the drawings, and various modifications and changes may be made without departing from its scope. The scope of the present application is only limited by the appended claims.

The invention claimed is:

1. A method for processing measurement gap pre-configuration, performed by a user equipment (UE), comprising:

receiving measurement gap indication information, wherein the measurement gap indication information is configured to indicate whether the UE needs a measurement gap on a configured bandwidth part (BWP);

wherein the measurement gap indication information comprises at least one of:

activation measurement gap indication information, configured to indicate at least one measurement object for which the UE needs the measurement gap on the configured BWP, and to activate a measurement gap of a measurement object on the configured BWP for the UE; or deactivation measurement gap indication information, configured to indicate at least one measurement object for which the UE does not need the measurement gap on the configured BWP, and to deactivate a measurement gap of a measurement object on the configured BWP for the UE;

wherein the measurement object is a measurement carrier.

2. The method of claim 1, wherein receiving the measurement gap indication information comprises at least one of:

receiving a measurement gap configuration (MeasGapConfig) signaling, wherein the activation measurement gap indication information is carried in the MeasGapConfig signaling; or receiving a measurement gap configuration (MeasGapConfig) signaling, wherein the deactivation measurement gap indication information is carried in the MeasGapConfig signaling.

3. A non-transitory computer-readable having stored thereon a computer-executable program that, when executed by a processor of a user equipment (UE), causes the UE to perform the method according to claim 1.

4. A method for processing measurement gap pre-configuration, performed by a base station, comprising:

sending measurement gap indication information, wherein the measurement gap indication information is configured to indicate whether a user equipment (UE) needs a measurement gap on a configured bandwidth part (BWP);

wherein the measurement gap indication information comprises at least one of:

activation measurement gap indication information, configured to indicate at least one measurement object for which the UE needs the measurement gap on the configured BWP, and to activate a measurement gap of a measurement object on the configured BWP for the UE; or deactivation measurement gap indication information, configured to indicate at least one measurement object for which the UE does not need the measurement gap on the configured BWP, and to deactivate a measurement gap of a measurement object on the configured BWP for the UE;

wherein the measurement object is a measurement carrier.

5. The method of claim 4, wherein sending the measurement gap indication information comprises at least one of:

sending a measurement gap configuration (MeasGapConfig) signaling, wherein the activation measurement gap indication information is carried in the MeasGapConfig signaling; or sending a measurement gap configuration (MeasGapConfig) signaling, wherein the deactivation measurement gap indication information is carried in the MeasGapConfig signaling.

6. The method of claim 4, further comprising:

sending measurement configuration information for measurement, wherein the measurement configuration information is configured to instruct the UE to perform the measurement on the configured BWP.

7. The method of claim 6, wherein sending the measurement configuration information comprises one of:

sending a radio resource control reconfiguration (RRCReconfiguration) message, wherein the measurement configuration information is carried in the RRCReconfiguration message; or sending a measurement configuration (measConfig) signaling, wherein the measurement configuration information is carried in the measConfig signaling.

8. The method of claim 4, further comprising:

sending a downlink bandwidth part information element (IE BWP-Downlink) signaling, wherein the IE BWP-Downlink signaling is configured to indicate the configured BWP for the UE.

9. The method of claim 8, wherein a bwp-Id field of the IE BWP-Downlink signaling is configured to indicate a maximum number of configured BWPs for the UE.

10. A base station, comprising:

a processor; and a memory configured to store instructions executable by the processor;

wherein the processor is configured to perform the method of claim 4.

11. A user equipment (UE), comprising:

a processor; and a memory configured to store instructions executable by the processor;

wherein the processor is configured to receiving measurement gap indication information, wherein the measurement gap indication information is configured to indicate whether the UE needs a measurement gap on a configured bandwidth part (BWP);

wherein the measurement gap indication information comprises at least one of:

activation measurement gap indication information, configured to indicate at least one measurement object for which the UE needs the measurement gap on the configured BWP, and to activate a measurement gap of a measurement object on the configured BWP for the UE; or deactivation measurement gap indication information, configured to indicate at least one measurement object for which the UE does not need the measurement gap on the configured BWP, and to deactivate a measurement gap of a measurement object on the configured BWP for the UE;

wherein the measurement object is a measurement carrier.

12. The UE of claim 11, wherein the processor is further configured to perform at least one of:

receiving a measurement gap configuration (MeasGap-Config) signaling, wherein the activation measurement gap indication information is carried in the MeasGap-Config signaling; or receiving a measurement gap configuration (MeasGap-Config) signaling, wherein the deactivation measurement gap indication information is carried in the MeasGapConfig signaling.

* * * * *